(12) United States Patent
Reime

(10) Patent No.: US 6,191,531 B1
(45) Date of Patent: Feb. 20, 2001

(54) DEVICE FOR INFLUENCING A LIGHTING INSTALLATION AS A FUNCTION OF AMBIENT LIGHT

(75) Inventor: Gerd Reime, Schomberg (DE)

(73) Assignee: Valeo Auto-Electric Wischer und Motoren GmbH (DE)

( * ) Notice: Under 35 U.S.C. 154(b), the term of this patent shall be extended for 0 days.

(21) Appl. No.: 09/530,508

(22) PCT Filed: Nov. 2, 1998

(86) PCT No.: PCT/EP98/06912

§ 371 Date: May 2, 2000

§ 102(e) Date: May 2, 2000

(87) PCT Pub. No.: WO99/22961

PCT Pub. Date: May 14, 1999

(30) Foreign Application Priority Data

Nov. 3, 1997 (DE) .............................. 197 48 454

(51) Int. Cl.[7] .................. B60Q 1/02; B60Q 1/04
(52) U.S. Cl. .................. 315/82; 315/150; 315/157; 307/10.8
(58) Field of Search .................. 315/82, 77, 83, 315/149, 157, 156, 150; 307/10.8

(56) References Cited

U.S. PATENT DOCUMENTS 5,614,788 * 3/1997 Mullins et al. .................. 315/82

* cited by examiner

Primary Examiner—David Vu
(74) Attorney, Agent, or Firm—Robert P. Seitter

(57) ABSTRACT

The invention relates to a device for influencing a lighting installation, and more particularly, includes a lighting installation of a motor vehicle, depending on ambient light. The device comprises a switching device to turn the lighting installation on and off. At least one optical sensor is provided to detect the wavelength of the ambient light. An evaluation device sends a control signal to the switching device when the wavelengths of the ambient light detected by the sensor are essentially those contained in the daylight. Since the filter and the sensor are jointly formed by at least one light emitting diode which operates as a light-sensitive element, the passing lights can be automatically turned on in a simple and favorable manner.

5 Claims, 1 Drawing Sheet

DEVICE FOR INFLUENCING A LIGHTING INSTALLATION AS A FUNCTION OF AMBIENT LIGHT

BACKGROUND

1. Field of the Invention

The invention relates to a device for influencing a lighting installation.

2. State of the Art

The present type of lighting installation frequently appears in the state of the art and, in a vehicle, serves to turn on and turn off, e.g., the exterior lighting of a vehicle consisting of headlights and tail lights. Because of the risks that arise when operating a vehicle under conditions of poor visibility or in twilight without turning on the lights, it is frequently desirable for the low-beam headlights of a vehicle to be turned on automatically and without the assistance by the vehicle operator.

It already has been proposed for this purpose, in DE 37 37 396 A1 and DE 196 08 184 C2, to employ a sensor device that detects changes in the ambient light and that turns on or turns off a lighting installation as a function of such changes. In this connection, the knowledge is employed that daylight contains wavelengths of light that may be detected unequivocally and which are not present in darkness or in the ambient light, or even in the presence of street lighting. Consequently, an optical filtering device is used in both cases, which, however, always is required in addition to the sensor and which filters the wavelengths of daylight. This occurs either by means of a preceding filtering glass, which, according to DE 37 37 395 A1 is a specialty glass of the Schott company, Mainz, or, according to DE 196 08 184 C2, a UV filter permanently fixed to a brightness sensor or, simply slipped onto the latter or to the holder of same. Alternatively, a corresponding filtering layer may be applied directly to a brightness filter by means of vacuum evaporation, spray-painting or conventional painting. Consequently, each case requires an additional step and an additional filtering device.

As is well known, many vehicle operators have decreased perceptive ability in darkness, which is further decreased by dampness or moisture on the windshield. In this respect, it already has been proposed, in DE-A 41 34 432 and in DE 196 03 663 C1, to control a precipitation sensor as a function of ambient light. At the same time, either a stray light detection device was assigned to an optical precipitation sensor or the precipitation sensor itself was used as a brightness sensor by filtering the signals to detect and evaluate the share of ambient brightness.

SUMMARY

From such a point of departure, the underlying purpose of the present invention is to create a device which, in a simple and favorable manner, automatically provides for the low-beam headlights to be turned on.

Since the boundary between day and night generally lies in the green region of the visible light spectrum, the wavelengths present in daylight may filtered simply by connecting, e.g., a green LED, as a light-sensitive detector. The signals of the green LED then are simultaneously the control signals for the switchgear, where, for a corresponding adaptation of the loud resistor of the LED, preferably, a high-resistance resistor, a reaction occurs which is limited to a certain wavelength range of light, preferably green light.

The fact that wavelengths in the green light region are only present during the day may also be used to advantage in connection with a water sensor. A water sensor of this type is known, e.g., from DE-GM 93 09 837.5. The optoelectronic measuring arrangement proposed therein works with at least two measuring areas, the signals of which are guided back to zero at the receiving end with a time constant which is shorter than changes which occur as a result of moisture. Consequently, windshield wiper control can be actuated automatically on the basis of detected dynamic changes, such that actuation of the windshield wipers always takes place at the time that the motor vehicle operator would also manually actuate the windshield wipers.

It is preferable for the present device to operate with LEDs in the red region of visible light, or in an invisible infrared region, and thus, clearly separate from the green light region which is decisive in turning on the low-beam headlights. In this way, both sensors may be integrated in one housing without mutual hindrance. However, there is a simultaneous possibility of employing a day/night recognition sensor also in order to influence control of the windshield wipers. In this respect, a precipitation sensor may be influenced as a function of light conditions; thus, e.g. a windshield wiper, in the presence of the two conditions "night" and "moisture" on the windshield, would wipe at a higher speed than it would during the day.

BRIEF DESCRIPTION OF THE DRAWING

In the following, the invention is explained in greater detail with the aid of an embodiment example and the accompanying drawing in which.

DESCRIPTION OF THE PREFERRED EMBODIMENTS

The invention will now be explained in an example with reference to the enclosed drawing. However, the embodiments are merely a matter of examples and do not limit the concept of the invention to a specific physical arrangement.

Figure 1:
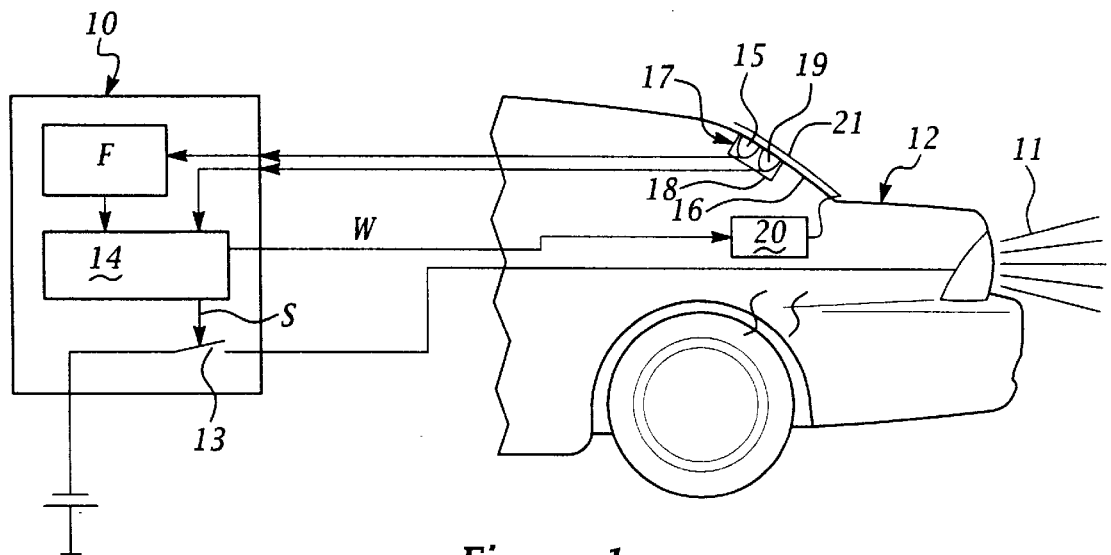
FIG. 1 shows a diagrammatic representation of the front end of a vehicle with an accompanying sensor device according to the invention.
Figure 2:
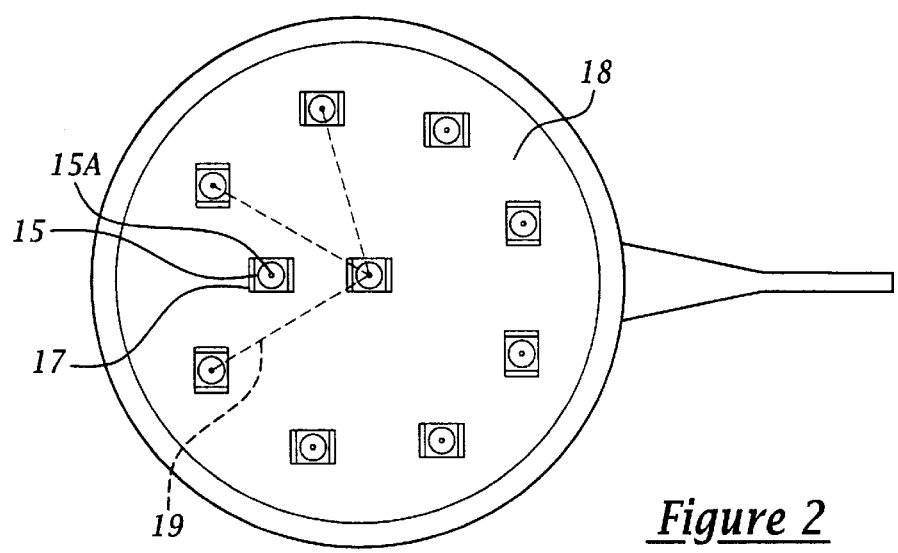
FIG. 2 shows a front view of the sensor device.

The device serves to influence a lighting installation 11, particularly that of a motor vehicle 12, as represented in FIG. 1. This is a matter of the normal parking lights and low-beam headlights of a vehicle. A driver usually operates the device manually by means of a switchgear 13, at least in order to turn on and off the lighting installation 11, provided that a change occurs in the lighting conditions of the ambient light.

The device 10 includes at least one sensor 17 for detecting wavelengths of ambient light. An ancillary evaluating device 14 is provided which produces a control signal S, if the wavelengths of ambient light detected by the sensor 17 are wavelengths which are contained predominantly in daylight and therefore preferably feature a wavelength which is shorter than that of the green light. If a control signal S is obtained, then the control signal S serves to actuate the switchgear 13 for turning on the lighting installation 11.

Sensor 17 and the evaluation device 14 feature a filter F in the form of an LED, which filters, in essence, the wavelengths contained in daylight. Consequently, only filtered wavelengths reach the evaluation device 14; thus, preferably, wavelengths less than or equal to the wavelengths continued in green light. However, it is self-evident that for the present invention, the boundary may be pushed still further in the direction of the region of the red light or in the opposite direction. At this time, e.g., blue LEDs also are being developed which are suitable for this application.

A green LED 15 jointly forms the filter F and, at the same time, also the sensor 17. On the basis of its construction, a green LED, inasmuch as this is interconnected as a light-sensitive element, automatically reacts only to the wavelengths of light contained in daylight and consequently has a filter effect. In this respect, the LED 15 itself may then produce the control signal S for the switchgear 13.

At the same time, one uses the knowledge that an LED emits light only in a limited spectral range based on the material used in each case for the crystal of the LED. For a green LED, the crystal consists, e.g., of a gallium arsenide-doped semiconductor material, which essentially radiates only at a certain wavelength. Consequently, if the LED is interconnected as a receiving element, these narrowly delimited spectral properties are utilized such that the LED receives only in an extremely narrow wavelength range. Consequently, the use of an additional filter, which would be mounted separately or produced separately, would be unnecessary. Consequently, the crystal 15a of an LED 15 interconnected as a receiver, is itself already the filter F. Consequently, not only is the manufacturing process more favorable, in addition, one may go back to LEDs which are more favorable in comparison to photodiodes, such that manufacturing expense may be reduced.

Thus, in order to use the signals established not only for turning on the low-beam headlights and, in addition, in order to achieve a compact construction, a sensor 17 may be integrated with a green LED 15 in a housing 18 that includes a water sensor 19, particularly, if the water sensor 19 operates optoelectronically, as explained, e.g., in DE GM 93 09 837.5.

Because the water sensor 19 generally detects a coating or moisture on a surface, such as the windshield 16, in the red or infrared wavelength range of light, both sensors, i.e., sensor 17 having a green LED 15 and water sensor 19 having a red LED, may be integrated in a single housing 18 and operated next to each other provided that it is assured that both operate within different optical wavelength ranges, which do not overlap, or only slightly overlap. In the embodiment, a water sensor operates in the infrared range, a display element which emits red light is present and the LED 15 reacts to green light. Based on the narrowly delimited spectral properties, the use of LEDs as receiving elements leads to a case in which different optical measuring systems may be operated together in a single housing, with the receiving element itself filtering out the wavelength range relevant in each case. This means that measuring areas need not be provided which are dimensioned and separated from each other or incoming signals need not be subsequently filtered. If necessary, the LEDs may even be arranged directly next to each other.

This arrangement then has the advantage that a night light recognition may simultaneously transmit signals, if necessary, even within the sensor housing, which influence the control device for the windshield wiper 21. When the sensor 17 essentially no longer locates wavelengths of daylight, the control signal S may transmit a signal W simultaneously to the control device 20 for the windshield wiper 21, which is actuated as a function of moisture detected by the water sensor 19. This usually occurs when "night" and "moisture" are detected simultaneously. If both conditions are present, then the control device 20 may drive windshield wiper 21, e.g., at a higher speed than would take place during the day operation.

It is self-evident that this description may be subject to the most diverse modifications, changes and adaptations, which are within the range of equivalence to the subordinate claims.

What is claimed is:

1. A device for influencing a lighting installation as a function of ambient light, comprising a switchgear at least for turning on and turning off the lighting installation; at least one optical sensor for detecting a wavelength of ambient light; an evaluation device for producing a control signal if the wavelengths of ambient light detected by the sensor are wavelengths which are essentially contained in daylight, with the control signal actuating the switchgear for switching the lighting installation; a filter that essentially filters the wavelengths of light that are contained in daylight, characterized in that filter and the sensor are formed jointly by means of at least one LED which is interconnected as a light-sensitive element.

2. The device of claim 1, characterized in that a crystal material of at least one LED is transmissive, as the filter, to wavelengths of light in the region in which the LED emits light.

3. The device of claim 1, characterized in that the LED is one of a green LED and a blue LED.

4. The device of claim 1, characterized in that the sensor is integrated in a housing which includes a water sensor which optically detects one of moisture and a covering of a surface, with the sensor and the water sensor operating on different optical wavelength regions, which do not substantially interfere with each other.

5. The device of claim 4, characterized in that if the sensor essentially detects no wavelength of daylight, the control signal simultaneously transmits a signal to a control device for a windshield wiper, which is actuated as a function of the moisture detected by the water sensor.

* * * * *